Aug. 24, 1943.

A. B. NEWTON 2,327,544

AIR CONDITIONING SYSTEM

Filed Dec. 3, 1938

Inventor
Alwin B. Newton
By George H Fisher
Attorney

Aug. 24, 1943.  A. B. NEWTON  2,327,544
AIR CONDITIONING SYSTEM
Filed Dec. 3, 1938   3 Sheets-Sheet 3

Inventor
Alwin B. Newton
By George H. Fisher
Attorney

Patented Aug. 24, 1943

2,327,544

UNITED STATES PATENT OFFICE 2,327,544

AIR CONDITIONING SYSTEM

Alwin B. Newton, Minneapolis, Minn., assignor to Minneapolis-Honeywell Regulator Company, Minneapolis, Minn., a corporation of Delaware Application December 3, 1938, Serial No. 243,843

22 Claims. (Cl. 62—6)

This invention relates to an air conditioning system and more particularly to a system for cooling and dehumidifying the air within a space.

This invention is more particularly concerned with the control of the temperature of an evaporator past which air which is being circulated to a space to be conditioned flows. The evaporator which forms a part of a mechanical refrigeration system is controlled by a thermostatic expansion valve which may be of conventional construction and means are provided for permitting a change in the superheat which is maintained in the evaporator by the expansion valve. It is well known that there is a substantial pressure drop through the evaporator, particularly where the evaporator is of substantial size such as a multiple coil type of evaporator having a refrigerant distributor at the inlet thereof. If the pressure connection to the valve is connected to the outlet of the evaporator the evaporator will be maintained at a substantially lower degree of superheat than if the pressure connection is connected to the inlet of the evaporator, for example although, as explained hereinafter, when the pressure connection is connected adjacent the evaporator inlet, the superheat will not be maintained at a fixed value. Accordingly if the location of the pressure connection to the valve is adjusted with respect to the evaporator, the valve is able to maintain the refrigerant in the outlet of the evaporator at varying degrees of superheat and this fact is made use of in carrying out the principles of my invention, since by varying the superheat of the refrigerant at the evaporator outlet, the ratio of the sensible to the latent cooling effect of the evaporator may be varied.

It is accordingly an object of my invention to control the ratio of sensible and latent cooling of an evaporator used in an air conditioning system by varying the location of the pressure connection to the expansion valve which controls the flow of refrigerant through the evaporator with respect to the evaporator so that varying degrees of superheat of the refrigerant at the outlet of the evaporator are maintained, whereby the temperature and humidity of the air in the space being conditioned may be readily controlled.

Other objects and advantages of my invention will become apparent upon a study of the specification, claims, and appended drawings wherein like reference characters represent like parts in the various views and wherein

Figure 1:
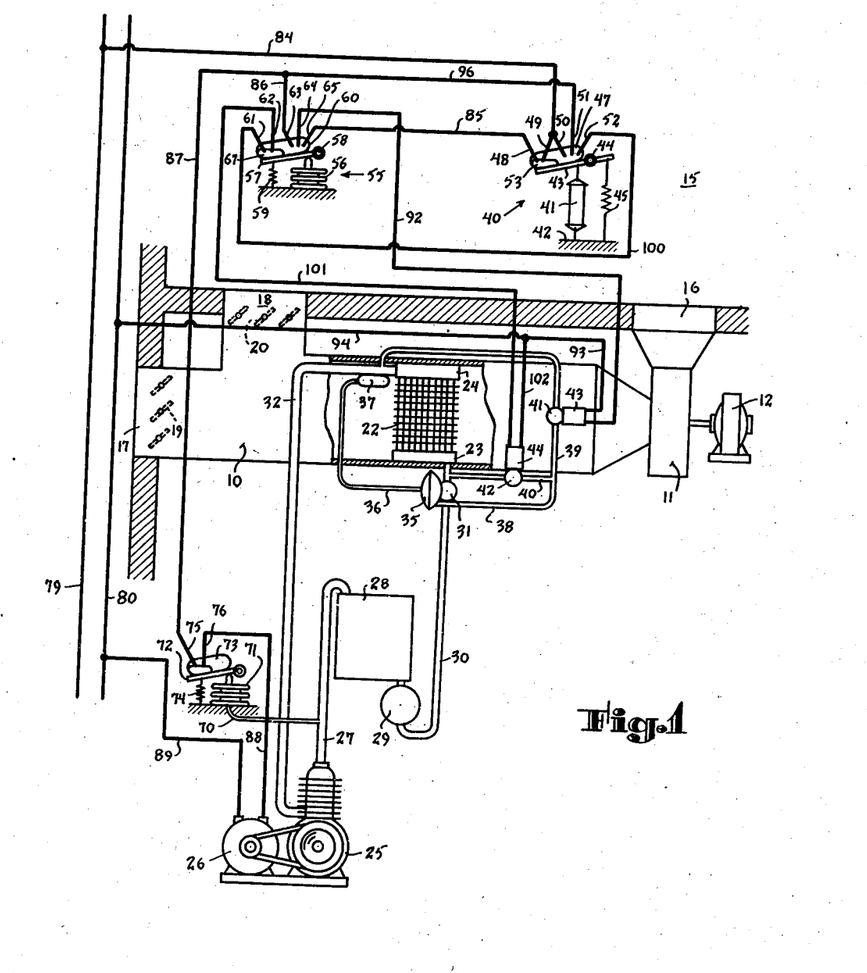
Figure 1 illustrates one form of an air conditioning system embodying the principles of my invention.

Referring now to Figure 1, an air conditioning chamber is illustrated by the reference character 10 and a fan 11 driven by a motor 12 causes air to flow through the chamber 10 and into the space 15, which is to be conditioned, by way of the outlet 16. The chamber 10 also includes a fresh air inlet 17 and a return air inlet 18, these inlets being controlled by dampers 19 and 20 whereby the proportions of fresh and return or recirculated air admitted to the chamber 10 may be controlled.

Located within the chamber 10 is an evaporator 22 of a mechanical refrigeration system, this evaporator being illustrated as a multiple pass type of evaporator having a distributer 23 and a collecting header 24. A compressor 25 driven by a motor 26 is provided for circulating refrigerant through the evaporator 22, the discharge side of the compressor 25 communicating by way of a pipe 27 with a condenser 28 within which the compressed refrigerant is condensed, the refrigerant then flowing to the receiver 29 from which it flows by way of the pipe 30 and the expansion valve 31 to the distributer 23. The evaporated refrigerant leaves the evaporator by way of the header 24 and the pipe 32 whence it flows back to the inlet side of the compressor 25. The operation of such a system is well understood by those skilled in the art and further description of the refrigerant cycle is believed to be unnecessary.

The expansion valve 31 may be any suitable type of thermostatic expansion valve, this valve including an operating diaphragm 35 for controlling the position of the valve element to control the flow of refrigerant into the evaporator. Connected to one side of the diaphragm 35 is a capillary tube 36 which terminates in a bulb 37 positioned in contact with the pipe 32 immediately adjacent the outlet of the evaporator 22. This capillary tube and bulb is provided with a suitable volatile fill whereby the pressure applied to one side of the diaphragm 35 varies in accordance with the temperature of the refrigerant leaving the evaporator 22. Connected to the opposite side of the diaphragm 35 is a pipe 38 to which is connected pipes 39 and 40 leading to the outlet and inlet of the evaporator 22, respectively. Valves 41 and 42 control communication through the pipes 39 and 40, respectively, these valves being controlled by solenoids 43 and 44, respectively, or by any other suitable means. When these solenoids are energized the valves operated thereby are moved to open positions and when the solenoids are deenergized the valves move to closed positions under the influence of gravity or any suitable biasing means (not shown). With the valve 41 open and the valve 42 closed the underside of the diaphragm 35 will respond to the pressure at the evaporator outlet whereas when the valve 42 is open and the valve 41 is closed the diaphragm responds to the pressure at the inlet of the evaporator. With an evaporator of the type disclosed embodying a plurality of coils connected in parallel, there is a substantial pressure difference between the inlet and outlet of the evaporator, particularly where a dense refrigerant such as Freon is employed. Accordingly the amount of superheat which is maintained at the outlet of the evaporator by the expansion valve 31 will be considerably greater when valve 42 is opened and valve 41 is closed than when valve 41 is opened and valve 42 is closed. The expansion valve 31 operates to maintain a predetermined difference between the pressure which corresponds to the temperature of the refrigerant at the evaporator outlet and the pressure of the refrigerant in the evaporator, and when this latter pressure is taken from the inlet of the evaporator the difference between the pressure corresponding to the temperature at the outlet of the evaporator and the pressure of the refrigerant at the outlet of the evaporator will be considerably greater than if the pressure is taken at the outlet of the evaporator. The actual degree of superheat which is maintained at the evaporator outlet when valve 42 is open and valve 41 is closed will fluctuate however, since the pressure drop through the evaporator varies as the load thereon varies, and upon an increase in the load thereon, the pressure drop therethrough will increase, thus increasing the superheat at the evaporator outlet, so that the evaporator automatically adapts itself to the load on the system. This will be true to a much lesser extent when the valve responds to the pressure at the evaporator outlet, so that at this time, the portion of the evaporator which is effective for cooling remains substantially constant. The effect of causing the evaporator 22 to operate at a high degree of superheat is to reduce the effective cooling surface of the evaporator since a smaller portion thereof is filled with liquid refrigerant but this liquid refrigerant will be at a lower pressure and consequently at a lower temperature so that the amount of latent cooling done by the evaporator for a given amount of sensible cooling will be considerably higher than when the evaporator is operated at a low degree of superheat whereupon substantially the whole surface of the evaporator is available for cooling but is operated at a higher temperature.

Located within the space 15 is a humidity responsive device 40 which comprises a humidity sensitive element 41 connected to a fixed support 42 and to a lever 43 pivoted at 44 and biased by means of the spring 45 in a direction to cause elongation of the humidity responsive element 41. Upon an increase in humidity in the space the element 41 elongates and the lever 43 rotates in a clockwise direction under the influence of the spring 45 and upon a decrease in humidity the contraction of the element 41 causes movement of the lever 43 in the opposite direction against the action of spring 45. Carried by the lever 43 is a mercury switch 47, this switch including terminals 48, 49, 50, 51, and 52. When the humidity is low and the switch is in the position illustrated, the terminals 48 and 49 are connected together by the mercury element 53. When the humidity in the space becomes sufficiently high the clockwise rotation of the lever 43 will cause the switch 48 to be tilted in the opposite direction whereupon the terminals 50, 51, and 52 are connected together by the mercury element 53.

Also located in the space 15 is a thermostat 55 which may be of any suitable construction but is shown to comprise a bellows 56 which may be provided with a suitable volatile fill, this bellows contacting a lever 57 pivoted at 58 and biased downwardly by the spring 59. Carried by the lever 57 is a mercury switch 60, this switch including terminals 61, 62, 63, 64, and 65. When the temperature in the space is low the bellows 56 is contracted, as illustrated, and the switch 60 is in the position illustrated wherein the mercury element 67 connects the terminals 61 and 62 together. When the temperature in the space rises sufficiently the expansion of the bellows 56 will cause the lever 57 to move upwardly and tilt the mercury switch to a position wherein the terminals 63, 64, and 65 are connected together by the mercury element 67.

Connected by means of a capillary tube 70 to the discharge pipe 27 from the compressor is a bellows 71 which controls the position of the lever 72 carrying the mercury switch 73, this lever being biased downwardly by spring 74. When the discharge pressure on the compressor is sufficiently low, the contacts 75 and 76 of the mercury switch are connected together but if the discharge pressure should become excessively high, the switch 73 will be tilted in the opposite direction whereupon the circuit through the terminals 75 and 76 is interrupted.

Line wires 79 and 80 are provided for supplying power to the compressor motor and the solenoids 43 and 44, these line wires being connected to a suitable source of power (not shown).

With the parts in the position illustrated the temperature and humidity in the space are both relatively low and the compressor motor 26 is deenergized so that the refrigeration system is not in operation. The solenoids 43 and 44 are also deenergized at this time so that the valves 41 and 42 are both closed.

Should the temperature in the space now become sufficiently high as to require cooling, the bellows 56 will expand and move the mercury switch 60 to a position wherein the terminals 63, 64, and 65 are connected together. It may be assumed at this time that the humidity in the space is still sufficiently low. A circuit is now completed to the compressor motor 26 as follows: from the line wire 79 through conductor 84, terminals 49 and 48 of the switch 47, conductor 85, terminals 65 and 63 of the mercury switch 60, conductors 86 and 87, mercury switch 73, conductor 88, motor 26, and conductor 89 to the line wire 80. The compressor 25 is now placed in operation to circulate refrigerant through the evaporator 22 in the well known manner.

At the same time a circuit is completed through the solenoid 43 as follows: from the line wire 79 through conductor 84, terminals 49 and 48 of the mercury switch 47, conductor 85, terminal 65 to 64 of switch 60, conductor 92, solenoid 43, and conductors 93 and 94 to the line wire 80. No circuit is completed at this time through the solenoid 44 so that the diaphragm 35 of the valve 31 is connected to the outlet of the evaporator 22 and accordingly the expansion valve 31 operates to maintain the refrigerant at the evaporator 22 at a low degree of superheat. As a result of this, substantially the whole surface of the evaporator is available for cooling purposes and the evaporator will operate at a relatively high temperature to cause a large amount of sensible cooling of the air passing through the chamber 10 with relatively little latent cooling of the air. Compressor 25 will continue to operate until the temperature in the space drops to the desired value unless the pressure on the discharge side of the compressor becomes sufficiently high to open the circuit at the mercury switch 73. It will be understood of course that any other suitable controls may also be provided for shutting down the compressor such as a low pressure cut-out or an overload switch. Since these controls form no part of the present invention, only the high pressure cut-out has been illustrated.

Assume now that the temperature in the space is sufficiently low but that the humidity within the space becomes excessive whereupon the contacts 50, 51, and 52 of the mercury switch 48 are connected together. A circuit will now be completed to the compressor motor 26 as follows: from the line wire 79 through conductor 84, terminals 50, 51 of the switch 47, conductors 96, 87, terminals 75 and 76 of the switch 73, conductor 88, compressor motor 26 and conductor 89 to the line wire 80. A circuit is also completed to the solenoid 44 as follows: from the line wire 84 through terminals 50 and 52 of the switch 47, conductor 100, terminals 61 and 62 of the switch 60, conductor 101, solenoid 44, and conductors 102 and 94 to the line wire 80. The circuit to the solenoid 43 is interrupted at this time at the terminal 64 of the switch 60 so that the valve 41 is in closed position and the valve 42 is in open position. Accordingly the diaphragm 35 of the expansion valve is subjected to the pressure at the inlet of the evaporator whereupon the expansion valve will cause the evaporator to operate at a high degree of superheat, which, as pointed out above, is variable, as the load on the evaporator varies, so that only a portion of the surface thereof, determined by the load on the evaporator, is available for cooling and the temperature of this surface will be relatively low so that there will be a large amount of latent cooling of the air passing over the evaporator for the amount of sensible cooling being done thereby. Accordingly the evaporator 22 will cause the moisture content of the air passing through the chamber 10 to be substantially reduced so as to lower the humidity in the space 15, this being done without any great reduction in the temperature of the space since the amount of sensible cooling of the air is materially less than when the evaporator is operating at a low degree of superheat.

It will now be seen that when the temperature within the space 15 is high and the humidity is low, the compressor will operate and the expansion valve 31 will cause the evaporator 22 to operate at a low degree of superheat whereas if the temperature in the space is low but the humidity is excessive the compressor will be operated and the expansion valve 31 will operate to maintain the evaporator 22 at a higher degree of superheat, the degree of superheat varying with the load on the evaporator.

Assume now that both the temperature and the humidity in the space is excessive so that both the mercury switches 47 and 60 are tilted to the opposite positions from those illustrated. The circuit to the compressor motor 26 will be the same as that described immediately above through the terminals 50 and 51 of the mercury switch 47. The solenoid 43 which operates the valve 41 will now be energized as follows: from the line wire 79 through conductor 84, contacts 50 and 51 of switch 47, conductors 96 and 86, terminals 63 and 64 of switch 60, conductor 92, solenoid 43, and conductors 93 and 94 to the line wire 80. The circuit through the solenoid 44 will be interrupted at the terminal 62 of the mercury switch 60 when the temperature is high so that the diaphragm 35 of the expansion valve is now subjected to the pressure at the evaporator outlet and the evaporator will be operated at a low degree of superheat so that a large amount of sensible cooling will be effected thereby.

It will now be understood that as long as the temperature in the space is excessive the evaporator 22 is operated at a low degree of superheat regardless of the humidity within the space but if the humidity is excessive and the temperature is sufficiently low the evaporator 22 will be operated at a relatively high but, as pointed out above, variable degree of superheat for dehumidification purposes. It will therefore be seen that by a relatively simple arrangement of providing two pressure connections between the operating diaphragm or bellows of the thermostatic expansion valve and the evaporator and controlling the communication through the two connections, control of the effective cooling surface of the evaporator is readily effected without the necessity of any changes in the expansion valve itself, and when dehumidification only is desired, the evaporator automatically adapts itself to the load thereon by taking advantage of the variable pressure drop therethrough.

Figure 2:
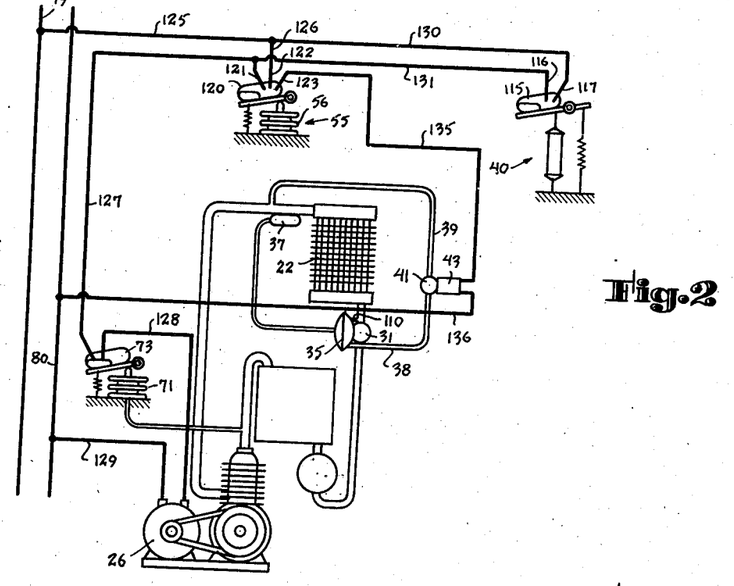
Figure 2 is a modification of the system shown in Figure 1.

Referring now to Figure 2 the air conditioning chamber has for simplicity been eliminated, as in the subsequent figures, but it will be understood that the evaporator 22 may be located in an air conditioning chamber similar to that in Figure 1. In this figure the pipe 40 and the valve 42 have been replaced by a small restricted passageway or orifice 110. The diaphragm 35 which controls the position of the expansion valve 31 is always in communication with the inlet of the evaporator through this small restricted passageway so that if the valve 41 is closed, the expansion valve will operate to maintain a relatively high degree of superheat within the evaporator. However, when the valve 41 is open, the diaphragm 35 will respond to the pressure at the outlet of the evaporator, since the pipes 38, 39 which provide communication between the diaphragm and the evaporator outlet are considerably larger in cross section than the opening through the restricted passageway 110. While the space below the diaphragm is still in communication with the inlet of the evaporator when the valve 41 is open, the high pressure refrigerant below the diaphragm will be permitted to flow through the pipe 38, 39 to the outlet of the evaporator and since this pipe is comparatively large the actual pressure existing below the diaphragm will correspond to that of the refrigerant at the evaporator outlet. Accordingly as long as the valve 41 is open, the expansion valve 31 will control the evaporator to maintain the refrigerant at the outlet thereof at a low degree of superheat.

In this form of the invention, the valve 41 is open only so long as the temperature in the space is excessive and the compressor is placed into operation whenever either the temperature or the humidity in the space is excessive as in Figure 1. The humidity responsive device 40 controls a mercury switch 115 having the two terminals 116 and 117 which are connected by the mercury element whenever the humidity within the space becomes excessive. The temperature responsive device 55 controls a mercury switch 120 having three terminals 121, 122, and 123 which are closed whenever the temperature within the space becomes excessive.

Whenever the temperature within the space is excessive, a circuit is completed through the compressor motor 26 as follows: from the line wire 79 through conductors 125, 126, terminals 122 and 121 of the switch 120, conductor 127, switch 73, conductor 128 through the compressor motor 26 and conductor 129 to the line wire 80. If the humidity in the space is excessive and the temperature therein is not excessive the compressor motor 26 is energized through the following circuit: from the line wire 79 through conductors 125, 130, switch 115, conductors 131 and 127, switch 73, conductor 128, compressor motor 26 and conductor 129 to the line wire 80. It will therefore be seen that either the humidity responsive device 40 or the temperature responsive device 55 can initiate operation of the compressor motor and start the refrigeration system in operation.

If the humidity in the space is excessive and the temperature is sufficiently low the valve 41 will be closed since there is no circuit to the solenoid 43 and the evaporator 22 operates at a low degree of superheat for dehumidification purposes. Should the temperature become excessive the following circuit through the solenoid 43 is established: from the line wire 79 through conductors 125, 126, terminals 122, 123 of the switch 120, conductor 135, solenoid 43, and conductor 136 to the line wire 80. The opening of the valve 41 renders the diaphragm 35 of the expansion valve responsive to the pressure of the refrigerant leaving the evaporator so that the expansion valve controls the evaporator to maintain the refrigerant at the outlet thereof at a relatively low degree of superheat whereby the evaporator causes a greater amount of sensible cooling of the air passing through the air conditioning chamber to reduce the temperature in the space being conditioned to the desired value. It will thus be seen that the system shown in this figure operates in substantially the same manner as in Figure 1 and requires only one valve for controlling the degree of superheat which is maintained by the evaporator.

Figure 3:
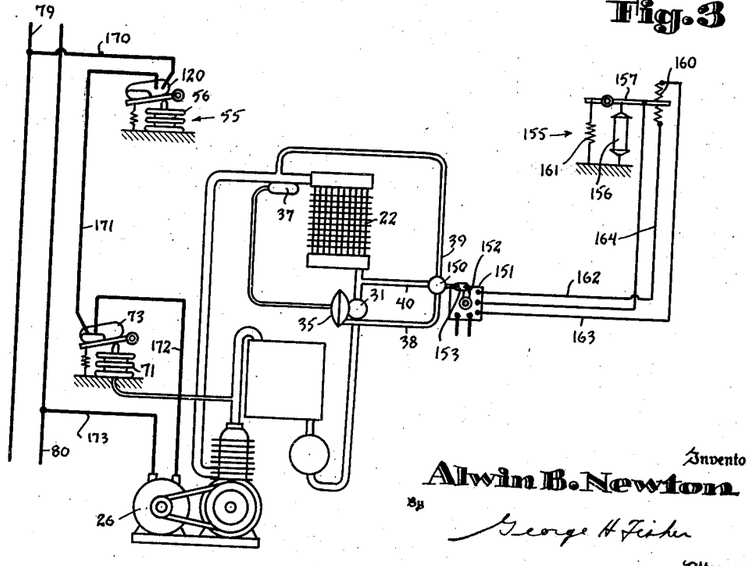
Figure 3 is another modification of the system of Figure 1.

Referring now to Figure 3 a three-way valve 150 is substituted for the two valves 41 and 42 of Figure 1, this valve being placed in the connection between the pipes 38, 39 and 40. A motor 151 is provided for controlling the position of the three-way valve 150 and this motor may be a proportioning motor of the type shown in Patent 2,028,110 issued to D. G. Taylor on January 14, 1936. This motor includes an operating arm 152 connected by a suitable link 153 to the stem of valve 150 and a humidity responsive device 155 is provided for controlling the operation of the motor. This device includes a humidity responsive element 156 connected to a lever 157, one end of which forms a slider arm of a potentiometer which includes a potentiometer resistance 160. The opposite end of the lever is biased downwardly by means of the spring 161 and it will be apparent that the position of the slider arm with respect to the resistance 160 will depend upon the humidity existing within the space being conditioned. The extremities of the resistance 160 are connected by means of conductors 162 and 163 to the outer terminals of the motor 151 whereas the slider arm is connected by the conductor 164 to the center terminal of the motor 151. As will be understood upon reference to the aforementioned Taylor patent, the position of the arm 152 of the motor 151 will vary in accordance with a change in position of the slider arm 157 with respect to the resistance 160 or in other words, will vary in accordance with the humidity within the space being conditioned. Therefore the position of the three-way valve 150 will vary in accordance with the humidity in the space.

With the valve 150 in one extreme position the diaphragm 35 will be subjected to the pressure of the refrigerant entering the evaporator through the pipes 38 and 40 and with the valve 150 in its other extreme position the diaphragm 35 will be subjected to the pressure of the refrigerant at the outlet of the evaporator through the pipes 38 and 39. Between these two extreme positions of the valve 150 the pressure applied to the underside of the diaphragm will vary from the minimum to the maximum in accordance with the intermediate position of the valve since this valve will act as a mixing valve and proportion the application of pressure from the inlet and outlet of the evaporator to the underside of the diaphragm and the effect of this is to subject the underside of the diaphragm to the pressure existing within various portions of the evaporator from the inlet to the outlet depending upon the position of the valve. It should be understood however that for any position of the valve, the pressure to which the underside of the diaphragm is subjected will correspond to the pressure in different portions of the evaporator as the load thereon varies, since the pressure drop therethrough will vary, and accordingly the evaporator will accordingly adjust itself for varying loads thereon. Accordingly the amount of superheat which is maintained at the evaporator outlet will vary in accordance with the humidity existing within the space, and will be adjusted by the temperature and humidity of the air passing thereover, or the load thereon, so that as the humidity increases the amount of superheat will increase and the amount of latent cooling done by the evaporator in proportion to the amount of sensible cooling will increase. It will be apparent that other controls may be substituted for those illustrated. For example, in a system wherein a large amount of fresh air passes over the evaporator, the compressor might be controlled by a room thermostat, and the valve 150 controlled by an outdoor thermostat, or a thermostat in the discharge duct, or in any other suitable manner.

The compressor motor in this figure has been illustrated as being controlled solely by the temperature in the space and it will be understood that when the temperature in the space rises sufficiently the mercury switch 120 controlled by the bellows 56 will be tilted to closed position and will establish the following circuit through the compressor motor: from the line wire 79 through conductor 170, switch 120, conductor 171, switch 73, conductor 172, motor 26 and conductor 173 to the line wire 80. Thus as long as the temperature in the space is at or below the desired value the refrigerating apparatus is out of operation. As soon however as the temperature in the space becomes excessive the compressor is started and the evaporator is operated to maintain a degree of superheat which is dependent upon the humidity within the space. As the humidity within the space starts to decrease the expansion valve 31 will be adjusted to maintain a smaller degree of superheat thus increasing the amount of sensible cooling and causing the temperature in the space to decrease at a greater rate.

It should be understood of course that if desired the humidity controller can also be arranged to start the compressor whenever there is a need for dehumidification within the space and it should be understood that the various control arrangements illustrated by this figure can be rearranged as shown by the other figures. While in Figures 1 and 2 the evaporator is shown as being operated at one of only two different degrees of superheat, in this figure the evaporator can be operated at any one of a great many different degrees of superheat between a minimum and a maximum.

Figure 4:
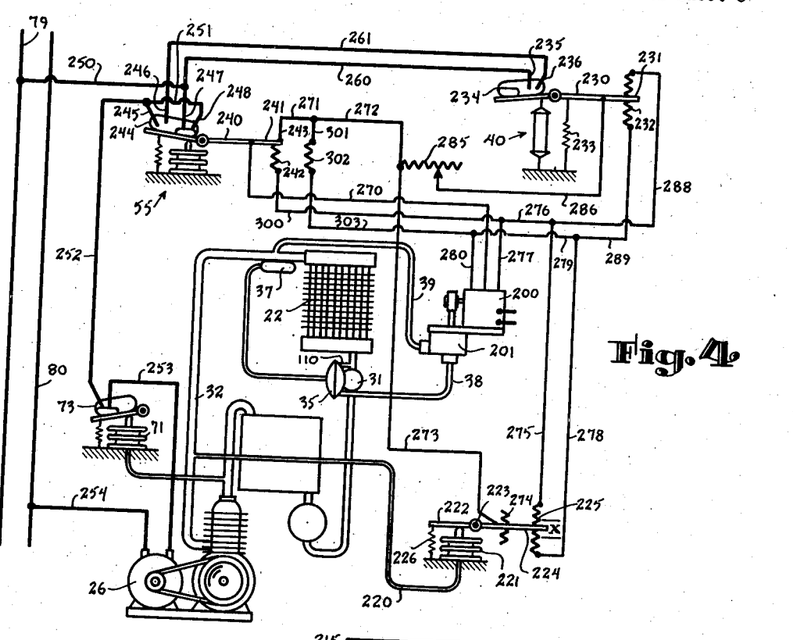
Figure 4 is a still further modification of the system of Figure 1.

Referring now to Figure 4, the diaphragm 35 is shown as being connected to the inlet end of the evaporator through a small restricted passageway 110 as in Figure 2. The valve which controls the communication between the diaphragm 35 and the outlet of the evaporator is a variable positioned valve which may be operated by a proportioning motor 200 similar to the proportioning motor 151 of Figure 3.

Figure 5:
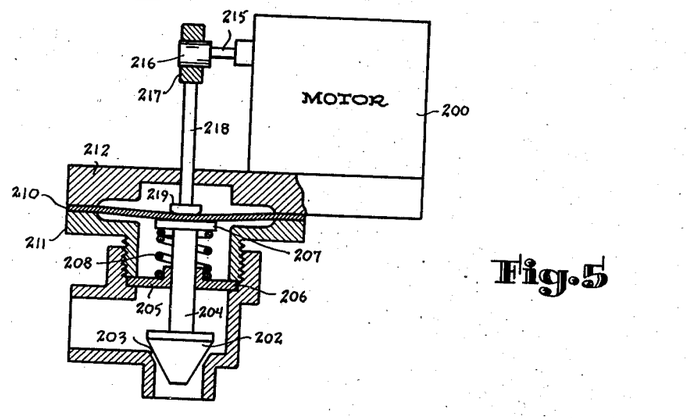
Figure 5 is a detailed view of a portion of the system of Figure 4 with certain parts shown in section.

Figure 5 illustrates a sectional view of this valve and it is herein shown as including a valve element 202 cooperating with a valve seat 203, the position of this valve with respect to the valve seat controlling the amount of flow through the pipes 38 and 39. The valve includes a valve stem 204 extending upwardly through a plate member 205 resting on the shoulders 206 of the valve casing, the upper end of the valve stem terminating in a flanged portion 207, there being a compression spring 208 between the flanged portion 207 and the plate 205 which biases the valve casing is sealed by means of a flexible diaphragm or bellows 210 received between a casing member 211 screw threadedly received by the valve casing and a plate member 212 which forms a support for the motor 200. The motor 200 includes an operating shaft 215 which terminates in a cam 216 which is received by a yoke 217 connected to the upper end of a plunger 218 which passes through the plate member 212 and terminates in an enlarged portion 219 which bears against the upper surface of the diaphragm 210. It will be understood that as the shaft 215 of the motor 200 rotates, the cam 216 causes vertical movement of the plunger 218 which in turn causes adjustment of the valve element 202 with respect to the seat 203. It will now be seen that the amount of communication between the lower side of the diaphragm 35 of the expansion valve 31 will depend upon the adjustment of the cam 216 carried by the motor shaft 215 and the effect of this is to cause the underside of the diaphragm 35 to respond to the pressure at different portions of the evaporator from the inlet to the outlet thereof as in Fig. 3.

Connected to the suction line 32 of the refrigerating apparatus by means of a pipe 220 is a bellows 221 which controls the position of a lever 222 pivoted at 223 and terminating in the slider arm 224 which cooperates with the potentiometer resistance 225. The opposite end of this lever is biased downwardly by means of a spring 226. The position of the slider arm 224 with respect to the potentiometer resistance 225 will vary in accordance with variations in the suction pressure of the refrigerating apparatus and upon an increase in this pressure the slider arm will move downwardly over the potentiometer resistance and upon a decrease in the suction pressure the slider arm will move in the opposite direction.

The humidity responsive device 40 controls the position of a lever 230 which terminates in a slider arm 231 which cooperates with a potentiometer resistance 232, this arm being biased downwardly by means of the spring 233. The opposite end of this lever carries a mercury switch 234 having terminals 235 and 236 which are arranged to be connected whenever the humidity in the space attains an excessively high value. As the humidity in the space decreases, the slider arm 231 moves upwardly with respect to the resistance 232 and upon an increase in the space humidity, the slider arm 231 moves in the opposite direction.

The thermostat 55 controls the position of a lever 240 which terminates in a slider arm 241 cooperating with the potentiometer resistance 242. This arm is arranged to move over the resistance 242 only after the temperature in the space has reached a certain high value and below this value the arm will move over the conducting element 243 as will be apparent from the drawings. The opposite end of the lever 240 carries a mercury switch 244 which includes terminals 245, 246, 247, and 248. These terminals are so arranged that whenever the temperature in the space is sufficiently high the terminals 247 and 248 will be connected by the mercury element. As the space temperature decreases from this value the mercury element moves out of engagement with these terminals and into engagement with the terminals 245 and 246. The terminal 246 extends only a short distance into the switch 244 and is so arranged with respect to the terminal 245 that if the temperature within the space drops sufficiently low the mercury element will move out of engagement with the terminal 246 so that none of the terminals of the switch are connected together.

The mercury switches carried by the levers 230 and 240 are arranged to control the operation of the compressor motor 26. If the temperature is sufficiently high, then terminals 247 and 248 of the switch 244 are connected together as illustrated and the compressor motor will be energized irrespective of the humidity in the space through the following circuit: from the line wire 79 through conductor 250, terminals 247 and 248, conductors 251, 252, the high pressure cut-out switch 73, conductor 253, compressor motor 26, and conductor 254 to the line wire 80. Thus as long as the temperature in the space is above the value at which terminals 247 and 248 are connected together the compressor motor 26 will be operated regardless of the relative humidity in the space. Should the temperature now drop so that the connection between the terminals 247 and 248 is interrupted but not drop sufficiently to break the circuit to the terminals 245 and 246, the compressor motor will be placed into operation if the relative humidity in the space rises high enough to close a circuit through the terminals 235 and 236 of the switch 234, this circuit now being as follows: from the line wire 79 through conductors 250, 260, the mercury switch 234, conductor 261, terminals 246 and 245 of the switch 244, conductor 252, mercury switch 73, conductor 253, motor 26, and conductor 254 to the line wire 80. Should the temperature in the space drop sufficiently however so that the mercury element in the switch 244 moves away from the terminal 246, the compressor motor will be placed out of operation regardless of the humidity in the space, thus preventing the evaporator 22 from lowering the space temperature below a desired value.

The suction pressure responsive controller 221 forms the main controller for the proportioning motor 200. With the various controllers in the positions illustrated, it will be seen that the center terminal of the motor 200 is connected to the slider arm 224 by way of conductor 270, slider arm 241, conductors 271, 272, 273, and the center tapped resistance 274 over which the slider arm 224 moves. The upper end of the resistance 225 is connected to the right hand terminal of the motor 200 by means of conductors 275, 276, and 277 whereas the lower end of the resistance 225 is connected by means of conductors 278, 279, and 280 to the left hand terminal of the motor 200. Accordingly as the suction pressure in the pipe 32 varies and the slider arm 224 moves with respect to the resistance 225 the proportioning motor will cause a movement of the valve element 202 with respect to the seat 203 by an amount which is proportional to this variation in the suction pressure.

The slider arm 231 operated by the humidity responsive device 40 also controls the motor 200. The slider arm 231 is connected to the center terminal of the motor by way of conductor 270, slider arm 241, conductors 271 and 272, variable resistance 285 and conductor 286. The upper end of the resistance 232 is connected to the right hand terminal of the motor 200 by means of conductors 288, 276 and 277 and the opposite end of this resistance is connected by means of conductors 289, 279 and 280 to the left hand terminal of the motor 200. It will accordingly be seen that movement of the slider arm 231 with respect to the resistance 232 will also cause the motor 200 to move the valve 202 with respect to the valve seat 203. The presence of the variable resistance 285 in the circuit of the slider arm 231 however causes this arm to be less effective than the slider arm 224 of the suction pressure controller 221. In other words, a movement of the arm 225 through the distance X will cause the same movement of the valve element 202 as will a movement of the slider arm 231 throughout the whole range of resistance 232. The effect of movement of the slider arm 231 with respect to the resistance 232 is therefore to shift the control range of the slider arm 224. If the humidity in the space increases and the slider arm 231 moves downwardly it has the effect of shifting the control range of the slider arm 224 upwardly with respect to the resistance 225 so that a lower suction pressure is maintained thereby in the suction line 32. The center tapped resistance 274 over which the slider arm 224 moves insures that the control range X of this slider arm will be of the same magnitude regardless of the location of this control range as determined by the humidity in the space.

From the foregoing description it will be seen that the valve 201 is adjusted to maintain a predetermined suction pressure in the suction line 32 and this pressure is in turn adjusted in accordance with the humidity existing in the space so that as the humidity in the space increases a lower suction pressure will be maintained in the suction line 32 and this is effected by causing the valve 201 to be adjusted so that the diaphragm member 35 which controls the position of the expansion valve responds to pressures at varying portions of the evaporator as determined by the adjustment of the valve 201 and the load on the evaporator. Thus with the humidity at a given value, the suction pressure controller 221 will operate the valve 202 to maintain the pressure in the pipe 32 at a predetermined value. Should the pressure decrease below this value, indicating that an insufficient amount of refrigerant is being supplied to the evaporator 22, the motor 200 will operate to move the valve element 202 to its open position so that the diaphragm 35 will be subjected to a pressure which is equivalent to a pressure of the refrigerant nearer the outlet of the evaporator which tends to decrease the superheat setting of the expansion valve and to increase the flow of refrigerant into the evaporator so that the pressure in the pipe 32 increases to the desired value. As the humidity in the space starts to decrease the control range of the controller 221 will be shifted downwardly thus tending to maintain a higher suction pressure in the pipe 32 by causing the expansion valve to maintain a lower degree of superheat in the evaporator.

Under excessive load conditions, as when the humidity in the space is very high and the thermostat 55 is also calling for cooling, the expansion valve 31 may be set to maintain a very high degree of superheat in the evaporator for dehumidification purposes with the result that insufficient sensible cooling of the air of the space is effected, and it is desirable under these conditions, should the temperature of the space rise to a sufficiently high value, to lower the superheat maintained in the evaporator so as to increase the amount of sensible cooling of the air in the space. It is for this purpose that the resistance 242 with which the slider arm 241 cooperates, is provided. With the thermostat in the position illustrated the temperature in the space is high enough to call for cooling but is not excessively high since the arm 241 is at one extremity of the resistance 242. The lower extremity of this resistance is connected to the right hand terminal of the motor 200 by means of the conductors 277 and 300. It is intended that this resistance have no effect whatever over the operation of the motor 200 until the arm 241 moves over the resistance and accordingly the opposite end of this resistance which is directly connected through the slider arm 241 and conductor 70 to the center terminal of the motor 200, is also connected by conductors 271 and 301 to a resistance element 302 having a resistance of the same value as that of the element 242. The opposite end of this resistance 302 is connected by means of the conductors 303 and 280 to the left hand terminal of the motor 200. It will thus be seen that when the slider arm 241 is above the resistance 242 the resistances 242 and 302 are connected between the center terminal of the motor 200 and the outer terminals thereof and will therefore have no effect on the motor 200 since they are of equal resistance values.

Assume now that the temperature in the space becomes excessively high whereupon the slider arm 241 of the thermostat 55 moves downwardly over the resistance 242. This has the effect of placing resistance in the circuits to the slider arms 224 and 230 and desensitizing these controllers and at the same time decreases the resistance between the center and right hand terminals of the motor which causes this motor to operate to move the valve element 202 towards open position. In other words, as the amount of the resistance 242 which is in series with the controller arms 224 and 230 is increased, the temperature controller assumes an increasing control effect over the valve 201 and the controlling effects of the suction pressure controller and the humidity responsive device are gradually reduced. It will therefore be apparent that when the temperature in the space becomes excessive, that regardless of the setting of the suction pressure controller as determined by the space relative humidity, the valve 201 will be open, thus subjecting the diaphragm 35 of the expansion valve 31 more and more to the pressure at the outlet of the evaporator, decreasing the degree of superheat at the evaporator outlet and thus increasing the sensible cooling capacity of the evaporator 22 so that the temperature of the space will be more rapidly reduced to the desired value.

When the space temperature has dropped sufficiently to move the slider arm 241 out of engagement with the resistance 242 the suction pressure controller 221 will again assume the main control over the valve 201 to operate the expansion valve to maintain the pressure in the suction line at a value which is dependent upon the space humidity.

Should the space humidity drop sufficiently so that the suction pressure controller is attempting to maintain a very high pressure in the suction line in which case the valve 201 would be in its wide open position, the bulb 37 which is in engagement with the suction line adjacent the evaporator will control the diaphragm 35 to prevent the superheat at the outlet of the evaporator from dropping below a predetermined minimum value thus preventing flow of liquid refrigerant in the suction line 32. It will therefore be seen that the bulb 37 cooperates with the diaphragm 35 to prevent the superheat being maintained in the evaporator from dropping below a predetermined minimum value.

It will now be seen that with the system shown in Figure 4 the humidity responsive device acts to maintain the pressure in the suction side of the refrigeration system at a value which depends upon the humidity existing in the space, thus effectively controlling the dehumidifying effect of the evaporator. If the temperature in the space however becomes excessive, the temperature controller assumes control over the evaporator to lower the degree of superheat maintained therein and thus decreasing the sensible cooling effect thereof. The compressor is arranged to be placed in operation whenever the temperature attains an undesirable value or whenever the humidity becomes excessive provided at this time the temperature in the space is not below the predetermined value which is lower than the temperature at which the thermostat initiates operation of the compressor.

Having described the preferred forms of my invention it will be understood that many modifications may be made thereto by those skilled in the art. For example, the various control features illustrated in the various figures may be combined with one another in many different ways without departing from the spirit of my invention. It will be understood of course that the humidity and temperature responsive devices may take any desired form and the expansion valves may be of any suitable construction employing either an operating diaphragm or an operating bellows or any other suitable operating means known to those skilled in the art. It should be understood therefore that my invention is limited only by the scope of the appended claims.

I claim as my invention:

1. In a system of the class described, an evaporator means, means for circulating refrigerant through said evaporator means, thermostatic expansion valve means for controlling the flow of refrigerant through said evaporator means, said expansion valve means including means responsive to conditions of temperature and pressure of the refrigerant within said evaporator, and valve means for selectively causing said last named means to respond to different pressures with respect to the evaporator means to cause different degrees of superheat of the refrigerant to be maintained at the outlet of the evaporator means.

2. In a system of the class described, a refrigeration system including an evaporator through which refrigerant is circulated, a thermostatic expansion valve for controlling the flow of refrigerant through the evaporator, said expansion valve including a pressure responsive operating means, a plurality of pressure communicating means between said pressure responsive means and different portions of said evaporator, and valve means for causing only one of said pressure communicating means to be effective at a time, whereby said pressure responsive means responds to pressures at different portions of said evaporator.

3. In a system of the class described, a refrigeration system including an evaporator through which refrigerant is circulated, a thermostatic expansion valve for controlling the flow of refrigerant through the evaporator, said expansion valve including a pressure responsive operating means, a plurality of pressure communicating means between said pressure responsive means and different portions of said evaporator, means for causing only one of said pressure communicating means to be effective at a time whereby said pressure responsive means responds to pressures at different portions of said evaporator, and means responsive to a condition being controlled by the evaporator in control of said last named means.

4. In a system of the class described, a refrigeration system including an evaporator through which refrigerant is circulated, a thermostatic expansion valve for controlling the flow of refrigerant through the evaporator, said expansion valve including a pressure responsive operating means, a pipe connecting said pressure responsive means with one portion of the evaporator, a second pipe connecting said pressure responsive means with another portion of the evaporator, valve means in each of said pipes, and condition responsive means in control of said valve means.

5. In a system of the class described, a refrigeration system including an evaporator through which a refrigerant is circulated, valve means controlling the flow of refrigerant through said evaporator, means causing said valve means to move towards open position as the temperature of the refrigerant leaving the evaporator increases and causing said valve means to move towards closed position as the pressure of the refrigerant in the evaporator increases, and valve means for causing said valve means to respond to the pressure of the refrigerant at different portions of the evaporator whereby varying degrees of superheat are maintained at the evaporator outlet.

6. In a system of the class described, a refrigeration system including an evaporator through which a refrigerant is circulated, valve means controlling the flow of refrigerant through said evaporator, means causing said valve means to move towards open position as the temperature of the refrigerant leaving the evaporator increases and causing said valve means to move towards closed position as the pressure of the refrigerant in the evaporator increases, means for causing said valve means to respond to the pressure of the refrigerant at different portions of the evaporator whereby varying degrees of superheat are maintained at the evaporator outlet, and means responsive to a condition being controlled by the evaporator in control of said last named means.

7. In a system of the class described, a refrigeration system including an evaporator through which refrigerant is circulated, a thermostatic expansion valve for controlling the flow of refrigerant through the evaporator, said expansion valve including a pressure responsive operating means, a pipe connecting said pressure responsive means with a portion of the evaporator, a second pipe connecting said pressure responsive means with another portion of the evaporator, and means for varying the relative resistances to flow through the two pipes so that the pressure responsive means responds to the pressure of the refrigerant at varying portions of the evaporator.

8. In a system of the class described, a refrigeration system including an evaporator through which refrigerant is circulated, a thermostatic expansion valve for controlling the flow of refrigerant through the evaporator, said expansion valve including a pressure responsive operating means, a pipe connecting said pressure responsive means with one portion of the evaporator, an orifice connecting said pressure responsive means with another portion of the evaporator, and valve means controlling the communication of pressure from the evaporator to said pressure responsive means by way of said pipe.

9. An air conditioning system including an air conditioning chamber, means for circulating air through said chamber and through a space to be conditioned, an evaporator of a refrigeration system in said chamber past which the air circulating through said chamber passes, said refrigeration system also including a compressor and an expansion valve for controlling the flow of refrigerant through said evaporator, a pressure responsive operating means for controlling the position of said valve, means for causing said pressure responsive operating means to respond to pressures at varying portions of the evaporator, and means responsive to a condition being controlled in said space in control of said last named means.

10. An air conditioning system including an air conditioning chamber, means for circulating air through said chamber and through a space to be conditioned, an evaporator of a refrigeration system in said chamber past which the air circulating through said chamber passes, said refrigeration system also including a compressor and an expansion valve for controlling the flow of refrigerant through said evaporator, a pressure responsive operating means for controlling the position of said valve, means for causing said pressure responsive operating means to respond to pressures at different portions of the evaporator, said means including a first pipe connecting the portion of the evaporator adjacent the outlet with said pressure responsive means and a second pipe connecting the portion of the evaporator adjacent the inlet with said pressure responsive means, a first valve means in control of said first pipe, a second valve means in control of said second pipe, means for causing opening of said first valve means in response to the attainment of a high predetermined temperature in said space, and means for causing closure of said first valve means and opening of said second valve means in response to the attainment of a high predetermined humidity in the space and a low predetermined temperature in the space.

11. An air conditioning system including an air conditioning chamber, means for circulating air through said chamber and through a space to be conditioned, an evaporator of a refrigeration system in said chamber past which the air circulating through said chamber passes, said refrigeration system also including a compressor and an expansion valve for controlling the flow of refrigerant through said evaporator, a pressure responsive operating means for controlling the position of said valve, means for causing said pressure responsive means to respond to the pressure adjacent the outlet of the evaporator whenever the temperature in the space is above a predetermined value and for causing the pressure responsive means to respond to the pressure adjacent the inlet of the evaporator whenever the humidity in the space is above a predetermined value and when the temperature in the space is below said predetermined value, and means for starting operation of the compressor whenever the temperature in the space is above said predetermined value or the humidity in the space is above said predetermined value.

12. An air conditioning system including an air conditioning chamber, means for circulating air through said chamber and through a space to be conditioned, an evaporator of a refrigeration system in said chamber past which the air circulating through said chamber passes, said refrigeration system also including a compressor and an expansion valve for controlling the flow of refrigerant through said evaporator, a pressure responsive operating means for controlling the position of said valve, means for causing said pressure responsive operating means to respond to pressures at different portions of the evaporator, said means including a relatively large pipe connecting the portion of the evaporator adjacent the outlet with said pressure responsive means and a small restricted passageway connecting the portion of the evaporator adjacent the inlet with said pressure responsive means, a valve controlling the transmission of pressure through said large pipe, and means for opening said valve whenever the temperature in the space is above a predetermined value.

13. An air conditioning system including an air conditioning chamber, means for circulating air through said chamber and through a space to be conditioned, an evaporator of a refrigeration system in said chamber past which the air circulating through said chamber passes, said refrigeration system also including a compressor and an expansion valve for controlling the flow of refrigerant through said evaporator, a pressure responsive operating means for controlling the position of said valve, means for causing said pressure responsive operating means to respond to pressures at different portions of the evaporator, said means including a relatively large pipe connecting the portion of the evaporator adjacent the outlet with said pressure responsive means and a small restricted passageway connecting the portion of the evaporator adjacent the inlet with said pressure responsive means, a valve controlling the transmission of pressure through said large pipe, means for opening said valve whenever the temperature in the space is above a predetermined value, and means for initiating operation of the compressor in response to the attainment of a high predetermined temperature or a high predetermined humidity in said space.

14. An air conditioning system including an air conditioning chamber, means for circulating air through said chamber and through a space to be conditioned, an evaporator of a refrigeration system in said chamber past which the air circulating through said chamber passes, said refrigeration system also including a compressor and an expansion valve for controlling the flow of refrigerant through said evaporator, a pressure responsive operating means for controlling the position of said valve, means for causing said pressure responsive operating means to respond to pressures at different portions of the evaporator, said means including a three-way mixing valve having a connection with the inlet of the evaporator, a connection with the outlet of the evaporator, and a connection with said pressure responsive operating means, and means responsive to an increase in humidity in the space for moving said valve to reduce the effectiveness of the connection to the outlet of the evaporator and to increase the effectiveness of the connection to the inlet of the evaporator.

15. An air conditioning system including an air conditioning chamber, means for circulating air through said chamber and through a space to be conditioned, an evaporator of a refrigeration system in said chamber past which the air circulating through said chamber passes, said refrigeration system also including a compressor and an expansion valve for controlling the flow of refrigerant through said evaporator, a pressure responsive operating means for controlling the position of said valve, means for causing said pressure responsive operating means to respond to pressures at different portions of the evaporator, said means including a three-way mixing valve having a connection with the inlet of the evaporator, a connection with the outlet of the evaporator, and a connection with said pressure responsive operating means, means responsive to an increase in humidity in the space for moving said valve to reduce the effectiveness of the connection to the outlet of the evaporator and to increase the effectiveness of the connection to the inlet of the evaporator, and means responsive to the temperature of the space for controlling the operation of the compressor.

16. An air conditioning system including an air conditioning chamber, means for circulating air through said chamber and through a space to be conditioned, an evaporator of a refrigeration system in said chamber past which the air circulating through said chamber passes, said refrigeration system also including a compressor and an expansion valve for controlling the flow of refrigerant through said evaporator, a pressure responsive operating means for controlling the position of said valve, means for causing said pressure responsive operating means to respond to pressures at varying portions of the evaporator, means controlling said last named means to maintain the suction pressure in the refrigerating system at a predetermined value, and means responsive to a condition to be controlled in said space for varying the suction pressure which is maintained.

17. An air conditioning system including an air conditioning chamber, means for circulating air through said chamber and through a space to be conditioned, an evaporator of a refrigeration system in said chamber past which the air circulating through said chamber passes, said refrigeration system also including a compressor and an expansion valve for controlling the flow of refrigerant through said evaporator, a pressure responsive operating means for controlling the position of said valve, means for causing said pressure responsive operating means to respond to pressures at varying portions of the evaporator, means controlling said last named means to maintain the suction pressure in the refrigerating system at a predetermined value, means responsive to an increase in the humidity in said space for lowering the suction pressure which is maintained, and means responsive to a rise in temperature in the space above a predetermined value for increasing the suction pressure which is maintained, regardless of the humidity in said space.

18. An air condition system including an air conditioning chamber, means for circulating air through said chamber and through a space to be conditioned, an evaporator of a refrigeration system in said chamber past which the air circulating through said chamber passes, said refrigeration system also including a compressor and an expansion valve for controlling the flow of refrigerant through said evaporator, a pressure responsive operating means for controlling the position of said valve, means for causing said pressure responsive operating means to respond to pressures at different portions of the evaporator, said means including a relatively large pipe connecting the portion of the evaporator adjacent the outlet with said pressure responsive means and a small restricted passageway connecting the portion of the evaporator adjacent the inlet with said pressure responsive means, a valve controlling the transmission of pressure through said large pipe, means responsive to the pressure on the suction side of the compressor for controlling said valve to maintain said pressure at a predetermined value, and means responsive to a condition being controlled in said space for adjusting the pressure which is being maintained.

19. In a system of the class described, an evaporator of the multiple coil type having a distributor at the inlet thereof to distribute the flow of refrigerant to the various coils thereof, thermostatic expansion valve means for controlling the flow of refrigerant to said distributor, means for circulating refrigerant through said expansion valve means and said evaporator, said expansion valve means including means responsive to conditions of temperature and pressure of the refrigerant within the evaporator, and means for selectively causing said last named means to respond to the pressure of the refrigerant at the outlet of the evaporator or to the pressure of the refrigerant between said expansion valve means and said distributor to cause variations in the degree of superheat maintained at the outlet of the evaporator.

20. In an air conditioning system, in combination, an evaporator for conditioning air passing thereover, a compressor for supplying refrigerant to said evaporator, a valve in control of the flow of refrigerant from the compressor to the evaporator, pressure responsive means in control of said valve, means for applying a force to said pressure responsive means commensurate with the temperature at the outlet of said evaporator to urge said valve towards open position upon increase in said temperature, means for applying an opposing pressure to said pressure responsive means to urge said valve towards closed position, said last-named means including connections for interconnecting said pressure responsive means, the outlet of said evaporator and a portion of said refrigeration system having a pressure higher than said outlet pressure, valve means in control of said connections, and means responsive to a psychrometric condition of the air being conditioned for modulating said valve means to vary said opposing pressure from a value equal to the outlet pressure to a substantially higher value whereby varying degrees of superheat are maintained at the outlet of said evaporator.

21. In an air conditioning system, in combination, an evaporator for conditioning air passing thereover, a compressor for supplying refrigerant to said evaporator, a valve in control of the flow of refrigerant from the compressor to the evaporator, pressure responsive means in control of said valve, means for applying a force to said pressure responsive means commensurate with the temperature of said evaporator to urge said valve towards open position upon increase in said temperature, means for applying an opposing pressure to said pressure responsive means to urge said valve towards closed position, said last-named means including connections for interconnecting said pressure responsive means, the outlet of said evaporator and a portion of said refrigeration system having a pressure higher than said outlet pressure, valve means in control of said connections, means responsive to the temperature of the air being conditioned, means responsive to the humidity of the air being conditioned, connections between one of said responsive means and the compressor for starting and stopping the same, and connections between the other of said responsive means and said valve means for modulating the same to vary said opposing pressure from a value equal to the outlet pressure to a substantially higher pressure.

22. In an air conditioning systems, in combination, an evaporator for conditioning air passing thereover, a compressor for supplying refrigerant to said evaporator, a valve in control of the flow of refrigerant from the compressor to the evaporator, pressure responsive means in control of said valve, means for applying a force to said pressure responsive means commensurate with the temperature of said evaporator to urge said valve towards open position upon increase in said temperature, means for applying an opposing pressure to said pressure responsive means to urge said valve towards closed position, said last-named means including connections for interconnecting said pressure responsive means, the outlet of said evaporator and a portion of said refrigeration system having a pressure higher than said outlet pressure, valve means in control of said connections, and means including means responsive to the temperature and the humidity of the air being conditioned for modulating said valve means to vary said opposing pressure in a relatively large number of steps.

ALWIN B. NEWTON.

CERTIFICATE OF CORRECTION.

Patent No. 2,327,544.  August 24, 1943.

ALWIN B. NEWTON.

It is hereby certified that error appears in the printed specification of the above numbered patent requiring correction as follows: Page 5, first column, line 53, after "valve" insert --to open position. The upper portion of the valve--; and that the said Letters Patent should be read with this correction therein that the same may conform to the record of the case in the Patent Office.

Signed and sealed this 23rd day of November, A. D. 1943.

(Seal)

Henry Van Arsdale,
Acting Commissioner of Patents.